May 1, 1962

R. G. FRIEDMAN 3,031,698

HIGH SPEED DOUBLE BLOW HEADER

Filed Jan. 14, 1959

INVENTOR.
ROBERT G. FRIEDMAN

BY
RICHEY, McNENNY & FARRINGTON

ATTORNEYS

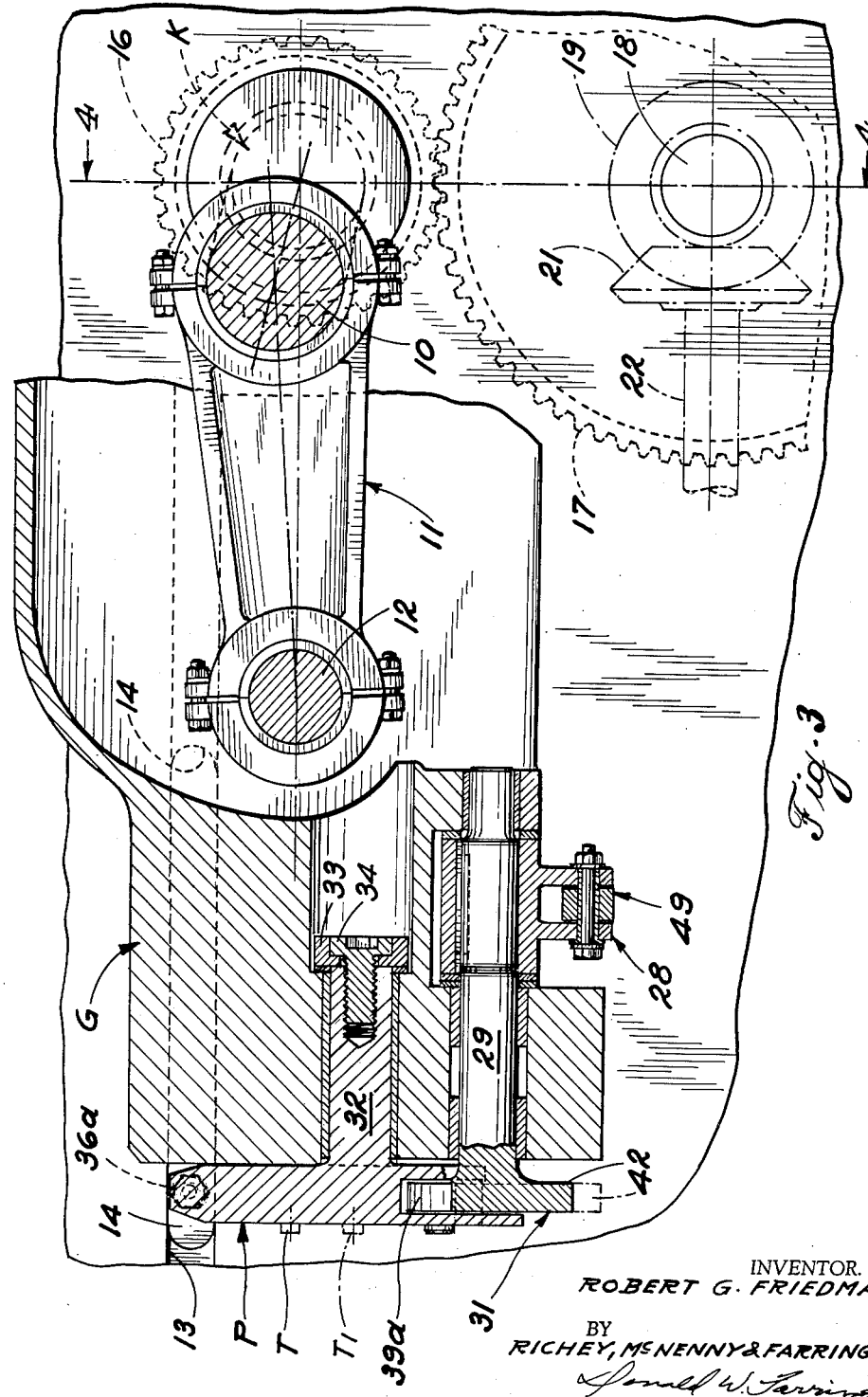

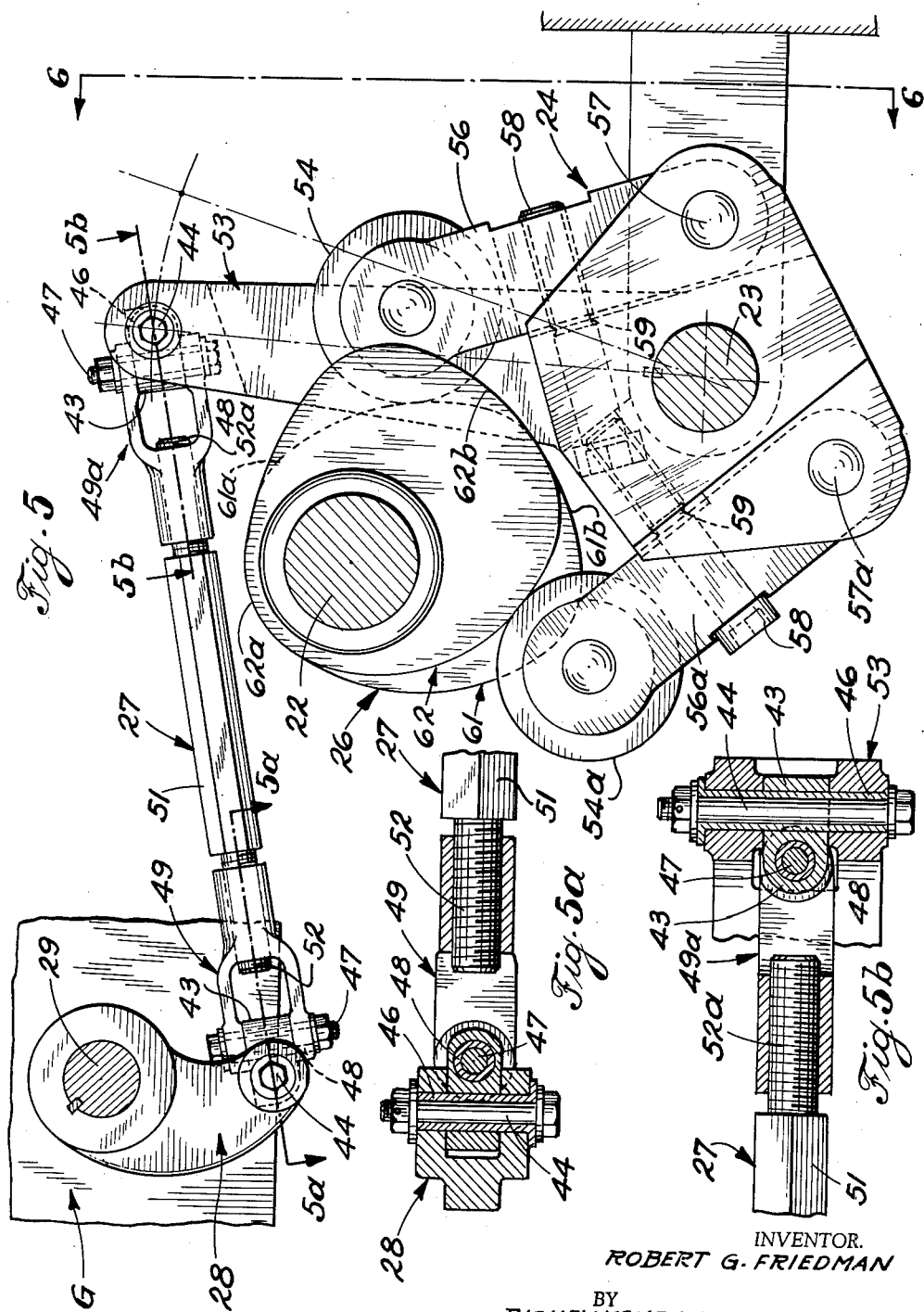

May 1, 1962   R. G. FRIEDMAN   3,031,698
HIGH SPEED DOUBLE BLOW HEADER
Filed Jan. 14, 1959   5 Sheets-Sheet 5

INVENTOR.
ROBERT G. FRIEDMAN
BY
RICHEY, McNENNY & FARRINGTON
ATTORNEYS

United States Patent Office 3,031,698
Patented May 1, 1962

3,031,698
HIGH SPEED DOUBLE BLOW HEADER
Robert G. Friedman, Tiffin, Ohio, assignor to The National Machinery Company, Tiffin, Ohio, a corporation of Ohio
Filed Jan. 14, 1959, Ser. No. 786,805
9 Claims. (Cl. 10—12.5)

Double blow headers have a bed frame carrying a reciprocating header slide, or gate, driven by a crankshaft on the frame, which gate carries a shiftable punch carrier operated at half crankshaft speed, so that on one advance stroke of the gate a first punch or tool engages a blank held by transfer fingers in alignment with a die, pushes the blank into the die and upsets the blank, and on the next advance stroke the punch carrier has shifted and so presents a second punch or tool to the work now recessed in the same die. After the second blow the blank is ejected from the die and the transfer fingers bring a new blank into a projected position in front of the die.

In these headers, the main or driving crankshaft turns continuously, as does the half speed cam shaft. This means that the gate, carrying the punches or tools is ever moving except at the very end of its stroke. The punch carrier, however, must remain motionless relative to the gate during the final portion of each advance stroke of the gate, while a punch is upsetting a blank in the die. The problem is one of moving the punch carrier mounted on the gate so as to shift the carrier between its two alternative positions at the correct time, and of positively maintaining the carrier in its operating position during the final portion of each advance stroke of the gate.

Reliance on a combination of positive stops for the punch carrier coupled with spring over-travel accommodation devices is unsatisfactory, particularly at high speed operation, because of flutter, bounce, pounding and general unreliability or inconsistency in operation. All of these occurrences can result in misalignment of the punches or tools with the work or die, and thus break or injure expensive tool parts.

The speed of operation of the machine, and the durability of the parts in service, also depend upon the necessary rates of acceleration and deceleration, and upon the mass of the parts which must be so accelerated and decelerated, since excessive loads on the driving and bearing parts cause excessive wear or breakage, and also interfere with the desired accuracy of timing and positioning, because of compression and stretch of the parts.

According to the present invention maximum accuracy is combined with maximum speed of operation in a double blow header by mounting on the reciprocating slide or gate a shiftable punch carrier, and an oscillating, positive motion cam means for shifting the carrier while controlling its acceleration and deceleration, and yet positively holding the carrier in its two operating positions. The cam means is oscillated by connections driven by the crankshaft, and the motion imparted to such connections by the reciprocation of the gate relative to the frame is accommodated by relatively small movement of the cam means on the gate in either direction, without corresponding movement of the punch carrier after it has moved the cam means on the gate to either of its two operating positions. In this manner the critical part of the movement of each of the parts on the gate is minimized, thereby minimizing the necessary rate of acceleration and deceleration and permitting the punch carrier to be moved to, and positively held in, each of its operating positions with maximum speed of operation followed by accuracy of positioning. This arrangement also minimizes the mass of the parts which must be carried on the reciprocating gate, thereby further contributing to speed and reliability of operation.

According to another feature of this invention the positive motion cam means carried by the reciprocating gate is oscillated by a second positive motion cam means on the frame, the latter cam means being driven by a continuously rotating half speed shaft geared to the crankshaft. This arrangement takes advantage of all of the advantages of the oscillating positive motion cam means carried on the gate and, at the same time, permits the second cam means on the frame to be contoured to give the optimum rate of acceleration and deceleration in each direction. It is necessary for the first punch to be shifted into, and held in alignment with, the die at a point substantially before the end of the first stroke of the gate so that the punch may engage a new blank held in transfer fingers, push the blank down into the die and finally upset the projecting end of the blank. However, the shifting movement to bring the second punch into alignment with the die can start at a point wherein the gate is much closer to the face of the die and such shifting motion can continue through the remainder of the first retracting stroke and the greater portion of the second advancing stroke, since the blank now remains seated and retracted in the die. Similarly, the carrier can start the shifting movement to bring the first punch back into alignment with the die at a point very close to the face of the die after the second blow but must complete this shifting movement at a point wherein the gate is spaced much farther back from the die on the next advance stroke so as to allow the necessary travel to push the next new blank into the die. Any extra dwell of either punch which may be required by a long punch or by a knock-out operation working on a long blank, in either the first or the second punch can be accommodated, all while maintaining optimum rates of acceleration and deceleration at all other points in the cycle.

According to another feature of the invention the motion of the cam means on the frame is transmitted to the oscillating cam means on the reciprocating gate by a connecting rod having ball and socket or universal joint connections permitting the reciprocation of the gate during the transmission of the oscillating motion between the two cam means. The use of a connecting rod for coupling the two cam means eliminates sliding connections between the parts. Such sliding connections are subject to inaccuracy from manufacturing tolerances and wear, and also from springing or yielding under acceleration and deceleration loads.

Other objects and advantages of the present invention will appear from the following detailed description of a preferred embodiment of the invention.

In the drawings:

FIG. 3 is a section taken along 3—3 of FIG. 2 showing the header slide or gate and associated drive parts.

FIG. 4 is a vertical section taken adjacent the crankshaft of the machine showing the drive to the half speed longitudinal cam shaft.

FIG. 5 is a composite front view with parts of the machine removed intended to show the driving cam and driving cam follower assembly connected by means of the universal joint link assembly to a rocker arm for shifting the punch carrier plate.

FIGS. 5a and 5b are sections throughout the universal joint and link assembly taken as indicated on 5a—5a and 5b—5b of FIG. 5.

Figure 1:
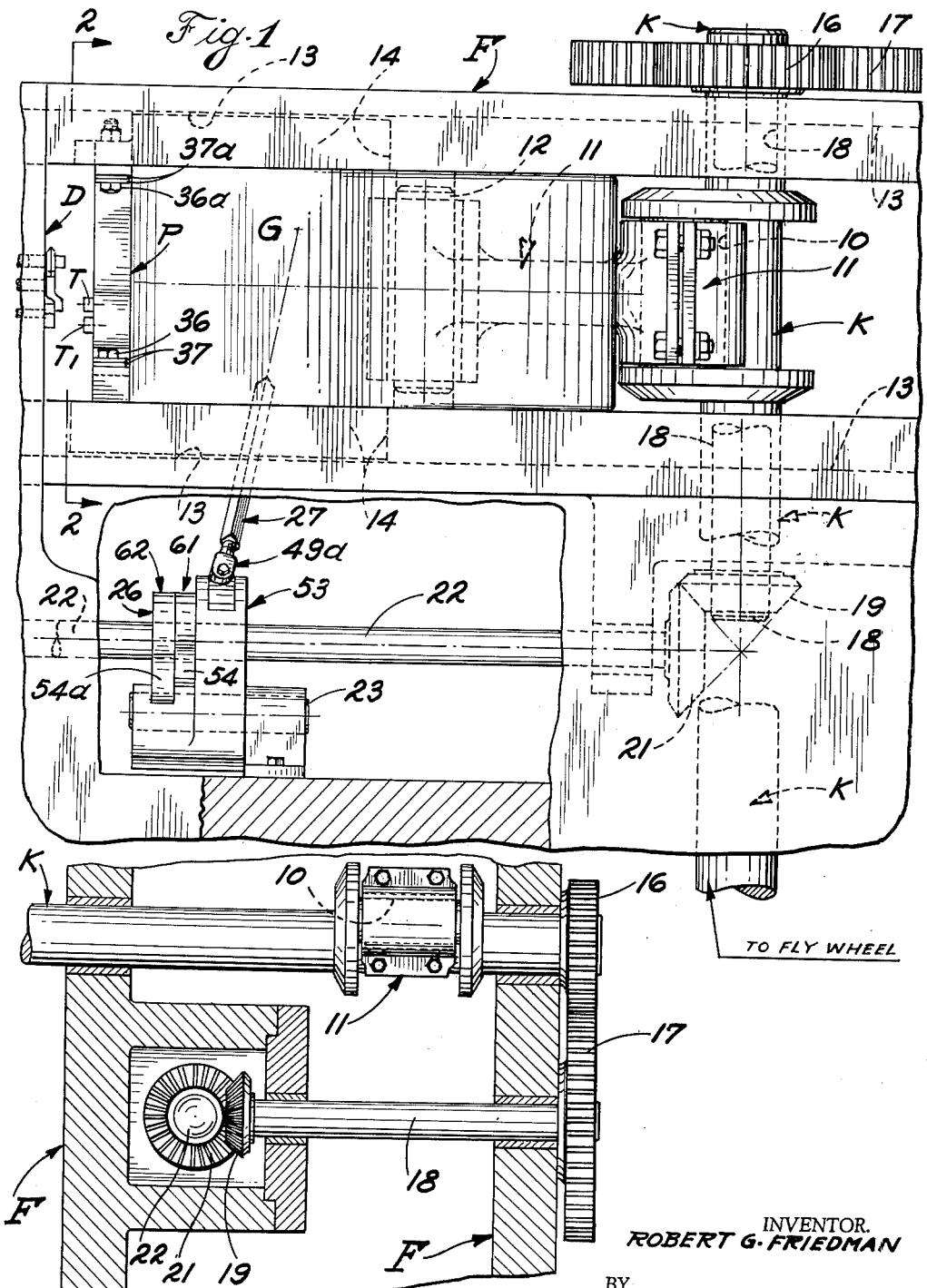
FIG. 1 is a plan view showing a double blow header embodying the invention.

A preferred embodiment of the invention includes a main frame F which supports a die breast D that carries the work receiving die, feed and transfer stations, suitable knockouts and shear and transfer mechanism such as that disclosed in Patent 2,599,053 issued to John H. Friedman.

The gate G carrying the tools is slidably mounted in the frame and incorporates a shiftable punch or tool carrier plate P which plate will have a pair of tools or punches T and $T_1$ that are alternatively positioned to the work disposed in the die in the die breast.

There is a main crankshaft K that carries a fly wheel and is power driven by a V belt and pulley arrangement known in the art. The crankshaft has an offset or crank portion 10 that drives a connecting rod or pitman member 11. The latter member is joined to the gate G by a crank pin 12 and the gate G slides in guide ways 13 formed in the frame F which receive guide flanges 14 extending laterally from the gate G.

Essential parts of the mechanism are driven at half crank shaft speed in the preferred embodiment of the invention. To this end, there is a driving pinion 16 keyed to crankshaft K which meshes with a half speed gear 17 keyed to a cross shaft 18, as is clearly indicated in FIG. 4. Cross shaft 18 carries a bevel gear 19 that meshes with a complementary gear 21 keyed to a longitudinal extending half speed accessary and cam shaft 22. Accessary shaft 22 operates the feed, shear transfer and knockout mechanism as indicated in the aforesaid patent. In addition this shaft provides the drive means for shifting the punch carrier P between either of its two alternative work positions as will be now described.

When the blank is presented to the working die, the blank extends from the face of the die by its length and thus the first tool must have been accurately positioned during the advance stroke of the gate in time to be ready to push the blank into the working die. The time available for positioning of the second tool is longer because now the blank is largely disposed in said die. It is a feature of this invention that a main drive of the punch plate shifting mechanism is of the positive-motion, double dwell type, with which the lifts of the cam can be formed to take full advantage of the "shift time" that is available.

Figure 6:
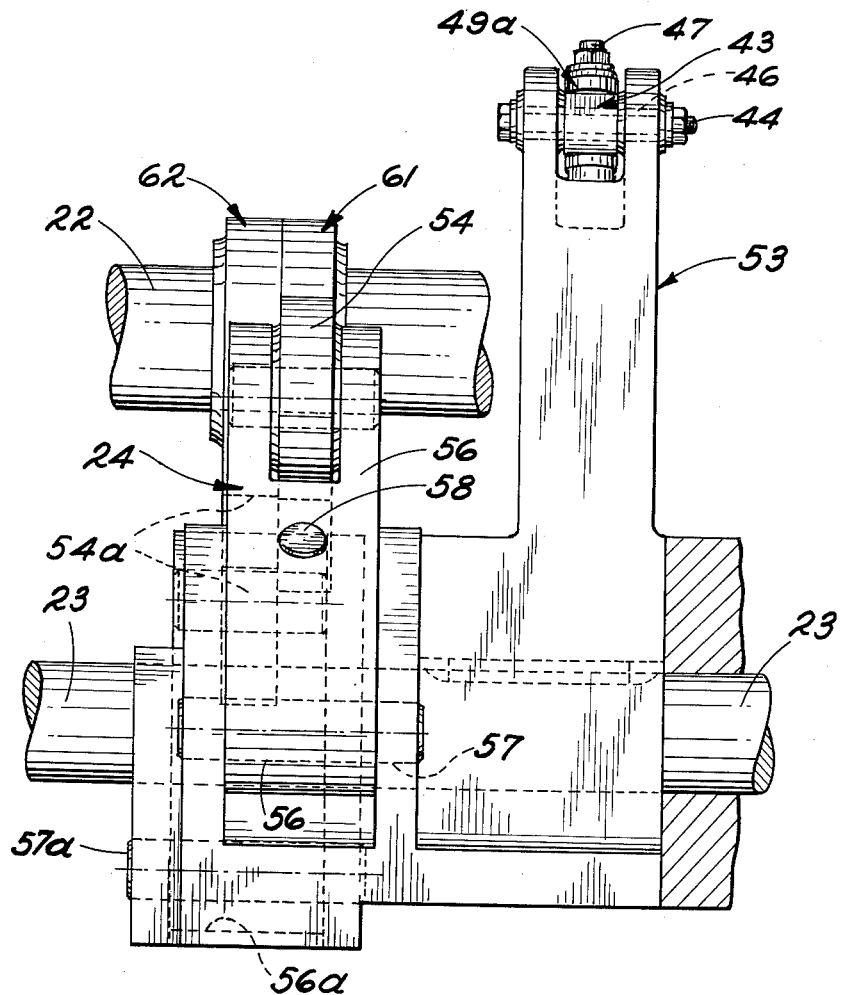
FIG. 6 is a side view of the drive cam and follower assembly.

As best seen in FIGS. 5 and 6, there is a longitudinal rocker pin 23 mounted in the frame below the longitudinal cam shaft 22. This rocker pin pivotally supports a cam follower assembly 24 which follower assembly is moved between either of two alternative positions by a positive motion, double dwell drive cam 26.

Figure 2:
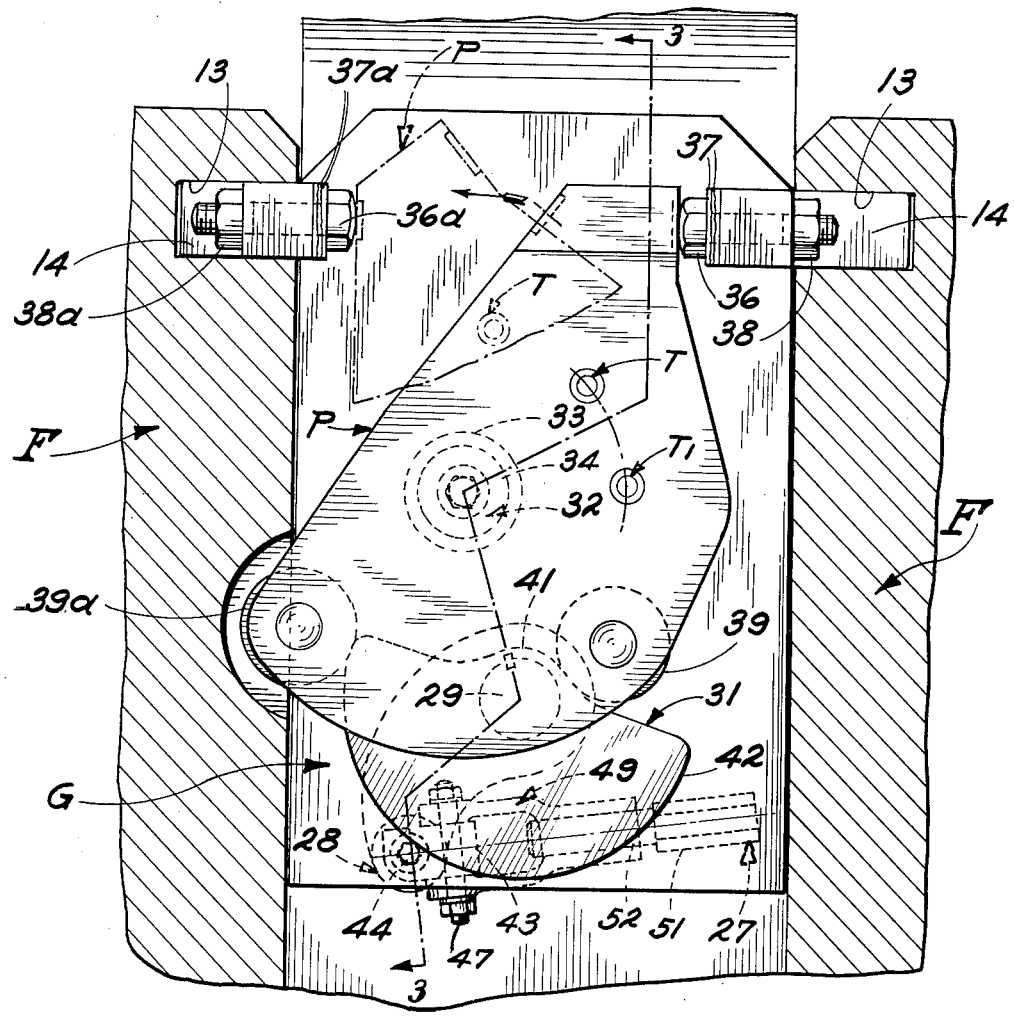
FIG. 2 is a front view showing the header slide or gate and the punch carrier plate, taken as indicated at 2—2 in FIG. 1.

As best seen in FIGS. 5, 5a, 5b, there is a universal joint and link assembly connecting the cam follower 24 driven by the drive cam 26 at one end, and a punch carrier shifting crank 28, seen best in FIGS. 2 and 5 at the other end. Crank arm 28 as seen in FIG. 3, for example, is keyed to a rocker shaft 29 that is pivotally mounted in the gate G and which at its outer end mounts a punch carrier shift cam 31. The punch carrier plate P is pivotally mounted on the gate by means of a stub shaft 32 retained in place by a collar 33 and set screw 34.

In the apparatus of this invention it is not required that there be positive stops for the punch carrier P in its two extreme positions but stops may be provided if desired. As best seen in FIG. 2, mounted on the gate G is a right hand stop bolt 36 backed up by partially compressed spring washers 37 and maintained in position by a nut 38. The corresponding left hand stop assembly as seen in FIG. 2 includes bolt 36a, a spring washer 37a and a nut 38a. The spring washers 37 and 37a can be so set up as to resiliently accommodate very slight motion of punch carrier P after it engages stop bolts 36 or 36a, so that all lost motion is eliminated.

The punch carrier shifting cam 31 is also of the positive motion, double-dwell type as seen in FIG. 2. This cam has a minor dwell arc 41 and a major dwell arc 42 for engaging rollers 39 and 39a mounted on the punch carrier P. Of course, there is a lift section joining the minor arc portion 41 with the major arc portion 42. In FIG. 2, for example, the punch carrier plate P has been shifted to the right due to clockwise rotation of the shift cam 31 imparted by left hand motion (in this figure) of the universal joint and link assembly 27. It can be seen in FIG. 2 for example, that further clockwise rotation of shift cam 31 produces nothing more than a dwell period and plate P has been locked in place and hence further rotation of the shift cam 31 will not move the punch carrier plate P, even though the universal joint and link assembly 27 will be shifted to the left as seen in FIG. 2, as the result of final advancing of the gate during its work stroke and after the drive cam 26 has reached a dwell position.

As best seen in FIGS. 5, 5a, 5b, the universal joint and link assembly 27 has at each end a universal joint, block or spider member 43 through which passes a pivot bolt 44 turning in a sleeve 46. Also passing through the block or spider member 43 is a right angle or cross pivot bolt 47 turning in a sleeve 48, and each of these cross bolts 47 connect to clevises 49. The assembly 27 is completed by a connecting link 51 having formed at opposite ends right and left hand threads 52, 52a to provide a fine adjustment for the parts. Either end may be pinned to its clevis after adjustment.

As seen in FIG. 5 the right hand end of link assembly 27 connects to a crank arm 53 on the drive cam follower assembly 24. Crank arm 53 also appears in FIG. 6. The drive cam follower assembly 24 carries opposed cam follower rollers 54, 54a and these are respectively mounted on arms 56, 56a as shown in FIG. 5. The latter arms are pivoted to the body of the drive cam follower assembly by means of pivots 57, 57a. Normally the arms 56, 56a carrying their respective cam follower rollers are rigid with the body of the cam follower because of clamp bolts 58 as seen in FIG. 5. However, I prefer to weaken these bolts as indicated at 59 in FIG. 5 so that if there is interference in shifting the punch carrier P on the gate G, either of the bolts may break and the punch carrier and associated drive mechanism mounted on the gate will not be overly strained.

As can be seen in FIG. 5 the drive cam unit 26 is preferably formed as an integral cam having a pair of cam surfaces disposed side by side. There is a cam surface 61 for follower roller 54 and another cam surface 62 for follower roller 54a. Cam surface 61 has a low dwell arc 61a and a high dwell arc 61b. Cam surface 62 likewise has a low dwell arc 62a and a high dwell arc 62b, there being lift portions between high and low dwell arc on each cam surface. Thus the drive cam 26 is arranged so that on rotation of the accessary shaft 22, the cam follower assembly is alternatively shifted between left and right positions as seen in FIG. 5 and then dwells in each of those positions even though rotation of shaft 22 continues.

The operation of the device should be apparent to those skilled in the art from the previous detailed description. However, to summarize the operation briefly, as the crankshaft advances and retracts the gate, the drive cam 26 and the shift cam 31 are so timed that the punch carrier P is alternately shifted to one of its two work positions before the tools engage the work. Once this shifting has occurred the tools on the gate are locked in place by the dwell arcs of the shifting cam 31, also, the number of wearing parts on the gate that effects final positioning of the tools is minimized.

After the punch carrier has been placed in either of its two work positions by the shift cam 31, further advance of the header slide, which might for example, cause the link assembly 27 to be pushed to the left as seen in FIG. 2, will have no effect on the position of the punch carrier plate because of the locating and locking action of the circular dwell arcs 41 and 42 on the shift cam 31.

Similarly, slight inaccuracies in the cam dwell surfaces on the drive cam 26 will not effect the positioning of the punch carrier, even though the drive cam 26 always rotates. Of course inaccuracies of the dwell portions 41 and 42 of the shift cam 31 could effect the position of the punch carrier. However, motion of the shift cam 31 during the work stroke is slight, so that high accuracy in the positioning of the carrier plate P is readily attained without extraordinarily precise machine work of the shift and drive cams. In other words, the punch carrier plate P is partially "isolated" during the work stroke from any disturbing effects of the constant rotation of the drive cam 26. This greatly reduces chances for final error. This construction also makes it unnecessary to provide positive rotation stops for the punch carrier plate although, as shown in FIG. 2, slightly resilient stops may be provided if desired to effect a spring clamp action of the punch carrier plate against the shift cam dwell portions in the two locked positions, due to slight deflection of spring washers 37 and 37a. These stops are not true positive stops and need only be used if it is desired to completely remove the very slight effects of wear on the parts mounted on the gate, as the machine is operated.

It can be seen that the apparatus of this invention makes possible high speed operation without flutter bounce or over-travel of the parts, and without requiring a sliding type connection or drive or an epicyclic gear train between the drive parts mounted on the frame and those mounted on the gate.

Although the foregoing description is necessarily of a detailed character, in order that the invention may be completely set forth, it is to be understood that modifications may be made without departing from the scope or spirit of the invention as herein claimed.

What is claimed is:

1. In a header, a frame, a gate reciprocably mounted therein, a punch carrier, means mounting said punch carrier on said gate for shifting motion between two alternative work positions, first cam means shiftably mounted on said gate and having lift portions and dwell portions, a pair of followers on said punch carrier, each of said followers being constantly in engagement with said first cam means, a shaft rotatably mounted on said frame and connected to rotate in timed relation to the reciprocation of said gate, second cam means driven by said shaft, follower means mounted to be shifted by said second cam means, and linkage connecting said follower means to said first cam means to shift the same.

2. In a header, a frame, a gate reciprocably mounted therein, a punch carrier on said gate, means mounting said punch carrier for oscillation between two work positions about an axis parallel to the direction of reciprocation of said gate, cam means mounted on said gate for oscillation, a pair of opposed cam followers secured to said punch carrier, said cam means having track portions constantly engaging both of said cam followers, said track portions including two lift portions, each terminating at each end in a dwell portion, whereby during oscillation of said cam means said lift portions oscillate said punch carrier into one or the other of said work positions and said dwell portions positively hold said punch carrier in such work position during continued oscillation of said cam means in the same direction, and drive means on said frame connected to oscillate said cam means in timed relation to the reciprocation of said gate.

3. A double blow header comprising a frame, a gate movably mounted on said frame, a main crankshaft, means between said main crankshaft and gate for reciprocating the gate, a half speed cam shaft driven by said main crankshaft, a punch carrier shiftably mounted on said gate for motion between two alternative work positions, a double-dwell, positive motion, punch carrier shifting cam pivotally mounted on said gate, cam follower means connected to said punch carrier and engaging said cam for shifting said punch carrier in response to pivotal motion of said punch carrier cam, a punch carrier drive means driven by said half speed cam shaft, and a universal joint and link assembly connecting said drive means to said punch carrier shifting cam, said drive means and cam being timed to maintain said punch carrier in either of said two alternative work positions during the work portion of the advance stroke of said gate, the timing of said punch carrier drive means being such that the punch carrier shifting cam brings said punch carrier alternately to its two work positions before said gate begins the working part of its advance stroke, the timing of the double-dwell portions of said punch carrier shifting cam being such that even though said universal joint and shaft assembly moves said punch carrier shifting cam slightly relative to said gate during final motion of said gate against the work, said punch carrier shifting cam imparts no motion to said punch carrier during such motion of the gate.

4. A double blow header comprising a frame, a gate slidably mounted on said frame, a main crankshaft, means between said main crankshaft and gate for reciprocating the gate, a half speed cam shaft driven by said main crankshaft, a punch carrier shiftably mounted on said gate for motion between two alternative work positions, a double-dwell, positive motion, punch carrier shifting cam mounted on said gate, cam follower means connected to said punch carrier and engaging said cam for shifting said punch carrier in response to motion of said punch carrier shifting cam, drive means for said punch carrier shifting cam driven by said half speed cam shaft, and a link assembly connecting said drive means to said punch carrier shifting cam, said drive means for said punch carrier shifting cam being timed to move said punch carrier shifting cam and hence said punch carrier between said two alternative work positions before said gate begins the actual working part of its advance stroke, the double-dwell portions of said punch carrier shifting cam being positioned so that even though said link assembly moves said punch carrier shifting cam slightly relative to said gate because of final advance motion of said gate relative to said shifting cam drive means, said final advance motion of the gate imparts no motion to said punch carrier.

5. A double blow header comprising a frame, a gate movably mounted on said frame, a main crankshaft, means between said main crankshaft and gate for reciprocating the gate, a half speed cam shaft driven by said main crankshaft, a punch carrier shiftably mounted on said gate for motion between two alternative work positions, a double-dwell, positive motion, punch carrier shifting cam mounted on said gate, cam follower means connected to said punch carrier and engaging said cam for shifting said punch carrier in response to motion of said punch carrier shifting cam, a double-dwell drive cam for said punch carrier shifting cam driven by said half speed cam shaft, a cam follower for said drive cam, and a link and universal joint assembly connecting said drive cam follower to said punch carrier shifting cam, said drive cam for said punch carrier shifting cam being timed to move said punch carrier shifting cam and hence said punch carrier between said two alternative work positions before said gate begins the actual working part of its advance stroke, the double-dwell portions of said punch carrier shifting cam being positioned so that even though said link assembly moves said punch carrier shifting cam slightly relative to said gate because of final advance motion of said gate relative to said shifting cam drive means, said final advance motion of the gate imparts no motion to said punch carrier.

6. A double blow header comprising a frame, a gate slidably mounted on said frame, a main crankshaft, means between said main crankshaft and gate for reciprocating the gate, a half speed cam shaft driven by said main crankshaft, a punch carrier shiftably mounted on said gate for motion between two alternative work positions, a double-dwell, positive motion, punch carrier shifting cam mounted on said gate, cam follower means connected to said punch carrier and engaging said cam for shifting said punch carrier in response to motion of said punch carrier shifting cam, a drive means for said shifting cam driven by said crankshaft, and a link assembly connecting said drive means to said punch carrier shifting cam, said drive means being timed relative to rotation of said crankshaft to move said punch carrier shifting cam and hence said punch carrier between said two alternative work positions before said gate begins the actual working part of its advance stroke, the double-dwell portions of said punch carrier shifting cam being positioned so that even though said link assembly moves said punch carrier shifting cam slightly relative to said gate because of final advance motion of said gate relative to said drive cam, said final advance motion of the gate imparts no motion to said punch carrier.

7. A double blow header comprising a frame, a gate slidably mounted on said frame, a main crankshaft, means between said main crankshaft and gate for reciprocating the gate, a half speed cam shaft driven by said main crankshaft, a punch carrier shiftably mounted on said gate for motion between two alternative work positions, a double-dwell, positive motion, punch carrier shifting cam mounted on said gate, cam follower means connected to said punch carrier and engaging said cam for shifting said punch carrier in response to motion of said punch carrier shifting cam, a double-dwell drive cam for said punch carrier shifting cam, means for operating said drive cam by said crankshaft, a cam follower for said drive cam, overload release means on said cam follower, and a link assembly connecting said drive cam follower to said punch carrier shifting cam, said double-dwell drive cam being timed relative to rotation of said half speed cam shaft to move said punch carrier shifting cam and hence said punch carrier between said two alternative work positions before said gate begins the actual working part of its advance stroke, the double-dwell portions of said punch carrier shifting cam being positioned so that even though said link assembly moves said punch carrier shifting cam slightly relative to said gate because of final advance motion of said gate relative to said drive cam, said final advance motion of the gate imparts no motion to said punch carrier.

8. A double blow header comprising a frame, a gate movably mounted on said frame, a main crankshaft, means between said main crankshaft and gate for reciprocating the gate, a half speed cam shaft driven by said main crankshaft, a punch carrier shiftably mounted on said gate for motion between two alternative work positions, a double-dwell, positive motion punch carrier shifting cam mounted on said gate, cam follower means connected to said punch carrier for shifting said punch carrier in response to motion of said punch carrier shifting cam, a double-dwell drive cam for said punch carrier shifting cam, means for operating said drive cam by said half speed cam shaft, a cam follower assembly for said drive cam, said cam follower assembly comprising a body member pivotally mounted on said frame, opposed arms pivoted on said body member, cam follower rollers on said arms, and weakened bolts clamping said arms to said body member, and a link assembly connecting said drive cam follower to said punch carrier shifting cam.

9. A double blow header comprising a frame, a gate slidably mounted on said frame, a main crankshaft, means between said main crankshaft and gate for reciprocating the gate, a half speed cam shaft driven by said main crankshaft, a punch carrier plate pivotally mounted on said gate for motion between two alternative work positions, a double-dwell, positive motion punch carrier shifting cam mounted on said gate, cam follower means connected to said punch carrier and engaging said cam for shifting said punch carrier in response to motion of said punch carrier shifting cam, a double-dwell drive cam for said punch carrier shifting cam, means for operating said drive cam by said half speed cam shaft, a cam follower for said drive cam, and a universal joint and link assembly connecting said drive cam follower to said punch carrier shifting cam, said double-dwell drive cam being timed to move said punch carrier shifting cam and hence said punch carrier plate between said two alternative work positions before said gate begins the actual working part of its advance stroke, the double-dwell portions of said punch carrier shifting cam being positioned so that even though said universal joint and link assembly moves said punch carrier shifting cam slightly relative to said gate because of final advance motion of said gate relative to said drive cam, said final advance motion of the gate imparts no motion to said punch carrier.

References Cited in the file of this patent

UNITED STATES PATENTS

| | | |
|---|---|---|
| 1,932,396 | Clouse | Oct. 31, 1933 |
| 2,275,665 | Wilcox | Mar. 10, 1942 |
| 2,404,210 | Bechler | July 16, 1946 |
| 2,599,053 | Friedman | June 3, 1952 |